US009108764B2

(12) United States Patent
Gegembauer

(10) Patent No.: US 9,108,764 B2
(45) Date of Patent: Aug. 18, 2015

(54) SYSTEM OF COMPACTABLE PACKAGE USABLE AN ASSEMBLY BLOCK, AND A MOUNTED ASSEMBLY

(75) Inventor: Luis Antônio Valesini Gegembauer, Rio de Janeiro (BR)

(73) Assignee: Luis Antonio Valesini Gegembauer, Rio de Janeiro (BR)

( * ) Notice: Subject to any disclaimer, the term of this patent is extended or adjusted under 35 U.S.C. 154(b) by 0 days.

(21) Appl. No.: 13/641,807

(22) PCT Filed: Apr. 29, 2011

(86) PCT No.: PCT/BR2011/000126
§ 371 (c)(1),
(2), (4) Date: Dec. 6, 2012

(87) PCT Pub. No.: WO2011/134034
PCT Pub. Date: Nov. 3, 2011

(65) Prior Publication Data
US 2013/0126368 A1 May 23, 2013

(30) Foreign Application Priority Data

Apr. 29, 2010 (BR) .................................... 1001354

(51) Int. Cl.
*B65D 21/00* (2006.01)
*B65D 21/02* (2006.01)
(Continued)

(52) U.S. Cl.
CPC .............. *B65D 21/00* (2013.01); *B65D 1/0292* (2013.01); *B65D 5/0005* (2013.01); *B65D 21/02* (2013.01); *B65D 21/0204* (2013.01); *B65D 21/086* (2013.01); *B65D 81/361* (2013.01)

(58) Field of Classification Search
CPC ...... B65D 1/0292; B65D 5/005; B65D 21/00; B65D 21/02; B65D 21/0204; B65D 21/086; B65D 81/361

USPC ................. 206/216, 223; 220/23.4, 23.6, 220/23.87–23.89; 52/405.2, 589.1–592.6, 52/602–606; 446/75, 76, 117, 124, 125, 446/128, 267
See application file for complete search history.

(56) References Cited

U.S. PATENT DOCUMENTS 5,310,071 A * 5/1994 Rivlin et al. .................. 220/23.4
5,493,816 A * 2/1996 Willemsen ..................... 52/604
(Continued)

FOREIGN PATENT DOCUMENTS

| BR | MU 6800018 U | 8/1989 |
| BR | MU 8501905-4 U | 11/2006 |
| FR | 2695627 A1 | 3/1994 |

OTHER PUBLICATIONS

International Searching Authority, International Search Report for International Application No. PCT/BR2011/000126, mailed Jun. 7, 2011, 5 pages, National Institute of Industrial Property, Brazil.
(Continued)

*Primary Examiner* — Bryon Gehman
(74) *Attorney, Agent, or Firm* — Alston & Bird LLC

(57) ABSTRACT

A package system is provided for compactable package that can be reused as an assembly block, which system has a compressible package (10) and two structural pieces (12, 13) for compacting and housing the package. Each of the structural pieces comprise: mutual engagement elements couplable to; an inner cavity for housing the package; external engagement elements arranged on its outer surface, engageable with at least one external piece provided with compatible engagement elements, wherein at least one of the structural pieces (12, 13) has a retention element arranged in the inner cavity for retaining the package inside said two structural pieces, and when the package is in the compressed state the structural pieces (12, 13) are engaged and locked with each other by the mutual engagement elements, forming an assembly block (14) for reusing the packages (1) and avoiding disposal and accumulation of garbage.

19 Claims, 16 Drawing Sheets

(51) Int. Cl.
*B65D 1/02* (2006.01)
*B65D 5/355* (2006.01)
*B65D 81/36* (2006.01)
*B65D 21/08* (2006.01)

(56) References Cited

U.S. PATENT DOCUMENTS

| | | | | |
|---|---|---|---|---|
| 5,746,038 | A | * | 5/1998 | Houk ............................ 52/590.1 |
| 5,775,046 | A | * | 7/1998 | Fanger et al. ................. 52/590.1 |
| 5,822,939 | A | * | 10/1998 | Haener ......................... 52/405.2 |
| 5,832,687 | A | * | 11/1998 | Willemsen ................... 52/592.6 |
| 6,050,044 | A | * | 4/2000 | McIntosh ...................... 52/591.1 |
| 6,105,330 | A | * | 8/2000 | Nanayakkara ................. 52/606 |
| 6,134,853 | A | * | 10/2000 | Haener ......................... 52/592.6 |

OTHER PUBLICATIONS

International Searching Authority, Written Opinion for International Application No. PCT/BR2011/000126, mailed Jun. 7, 2011, 7 pages, National Institute of Industrial Property, Brazil.

The International Bureau of WIPO, International Preliminary Report on Patentability for International Application No. PCT/BR2011/000126, mailed Nov. 8, 2012, 9 pages, National Institute of Industrial Property, Brazil.

* cited by examiner

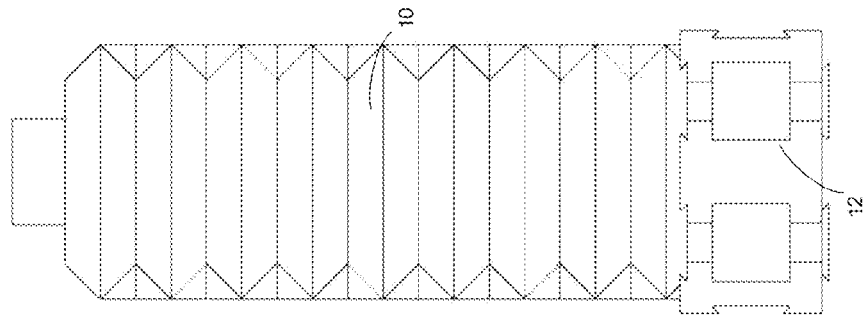
*Fig.1A*
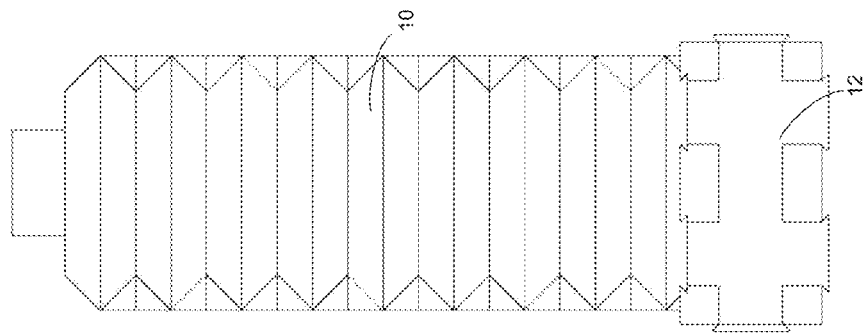
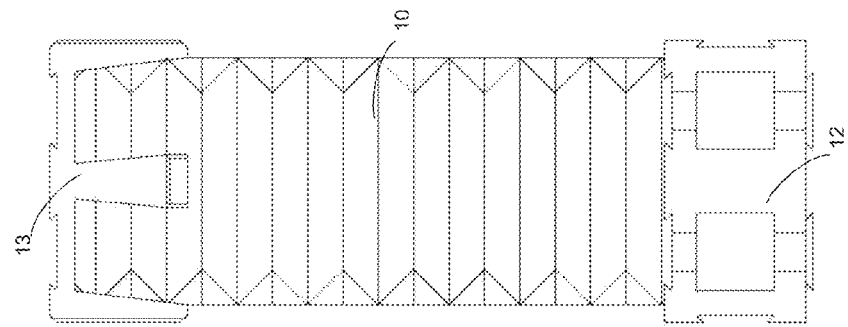
*Fig.1B*
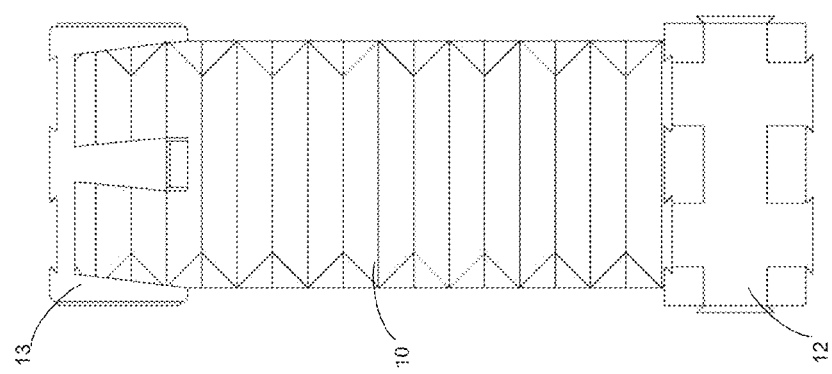

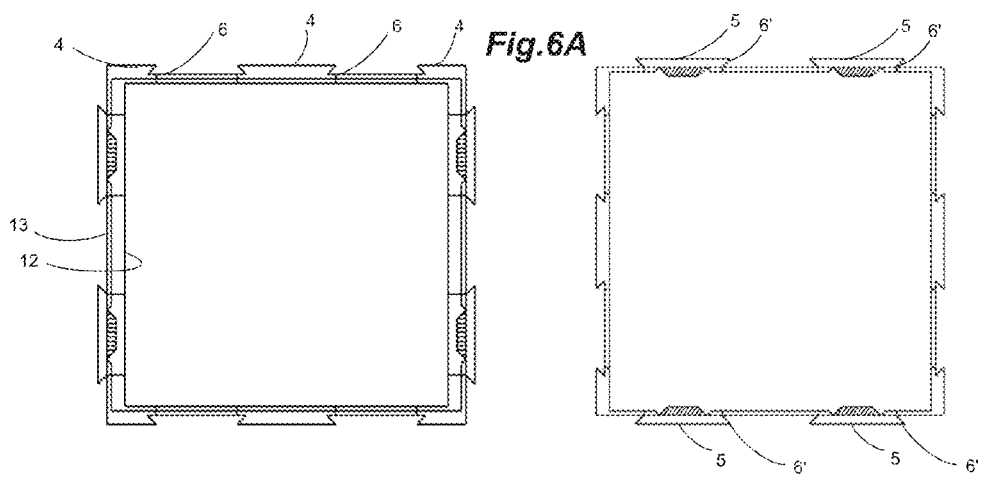
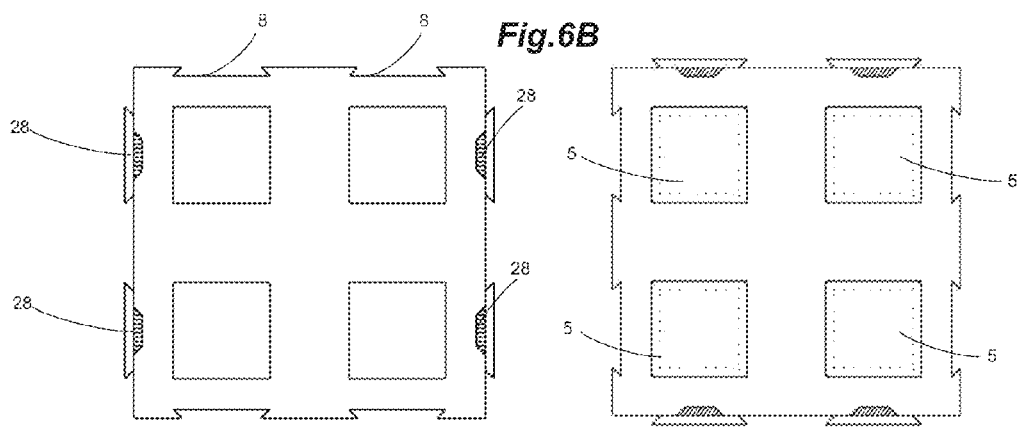
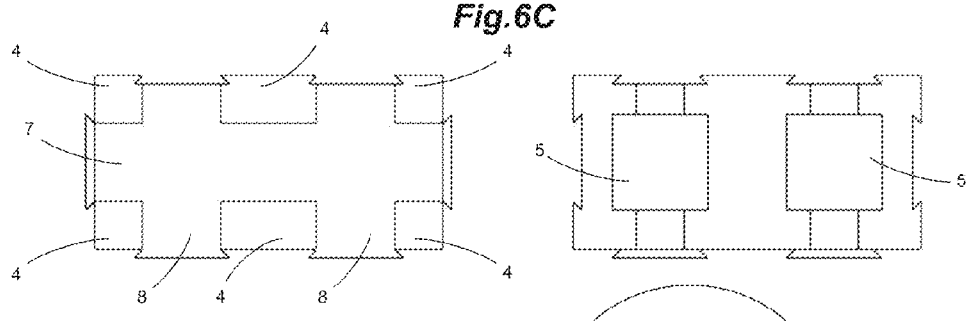
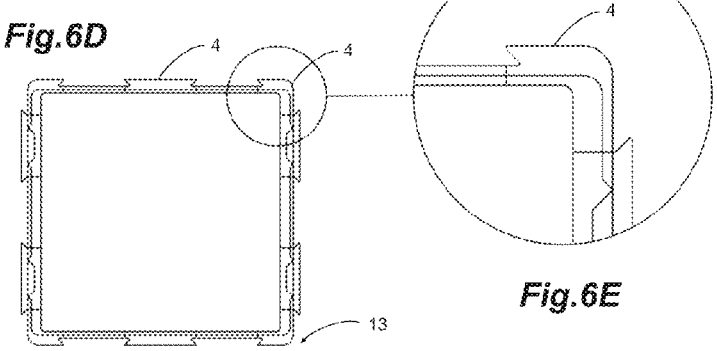

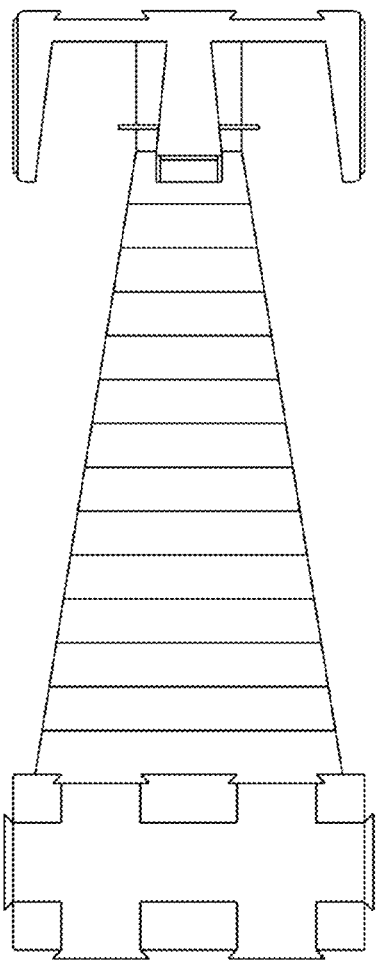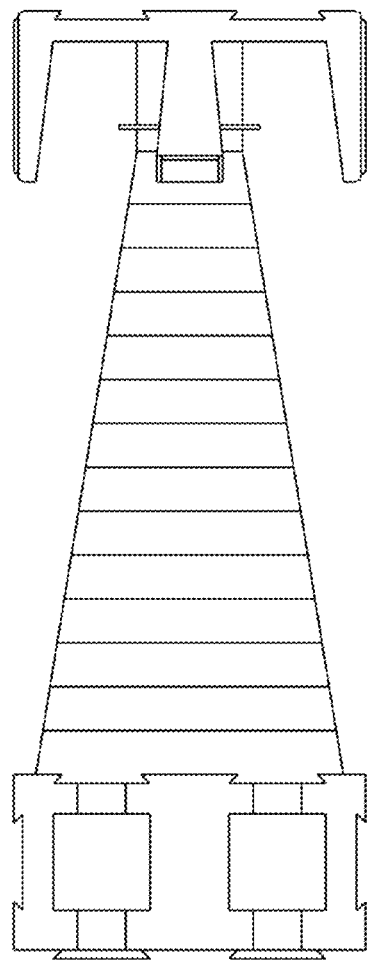
Fig.8A    Fig.8B
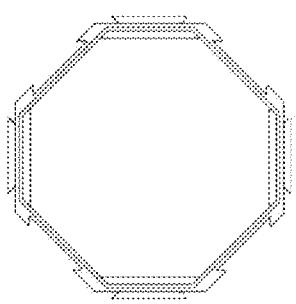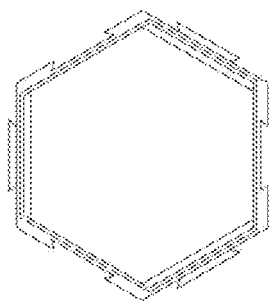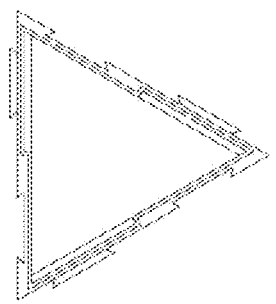
Fig.8E    Fig.8D    Fig.8C

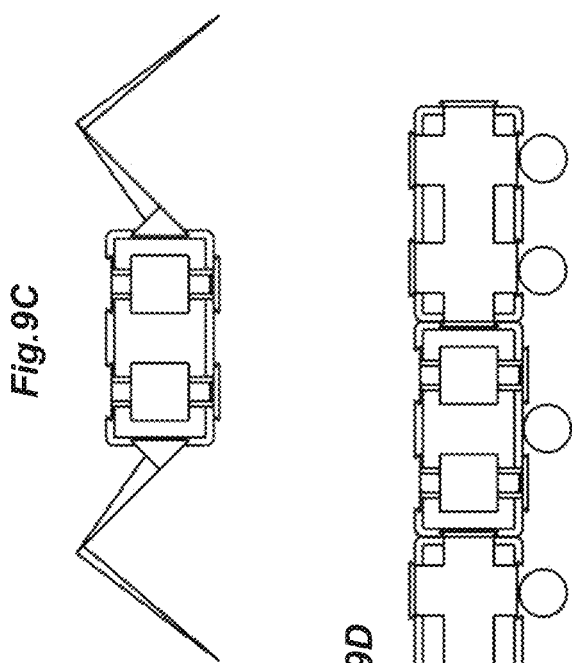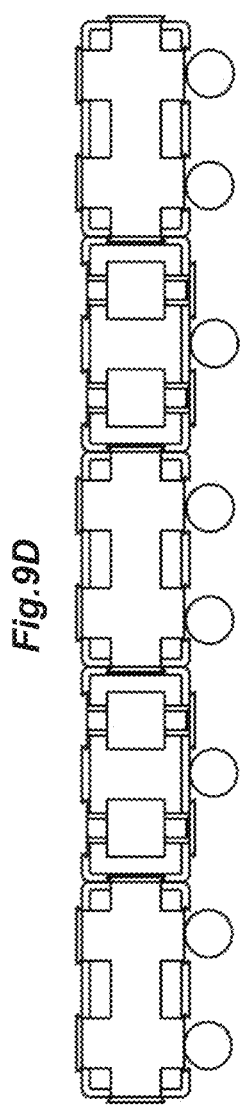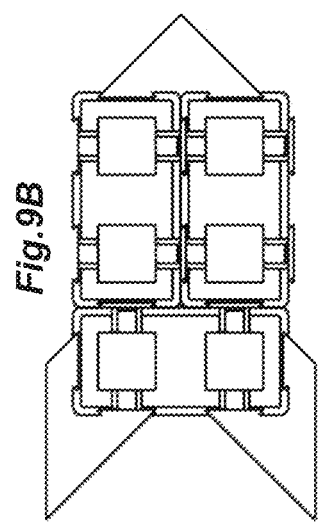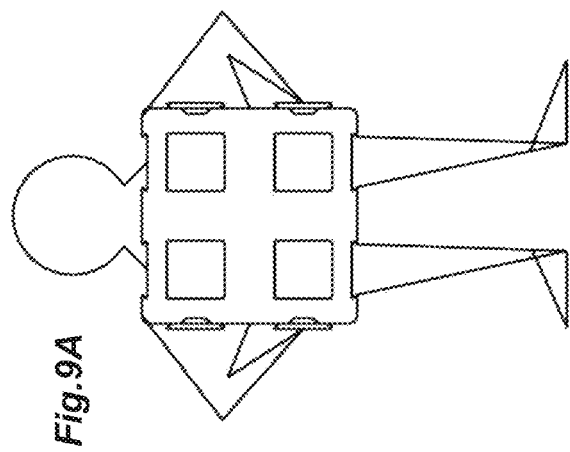

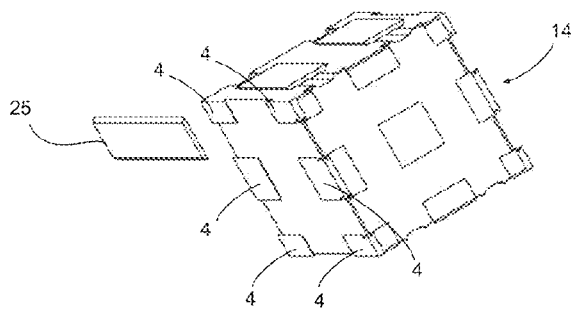
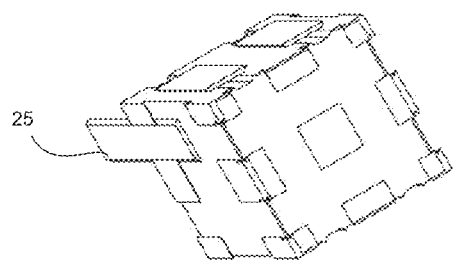
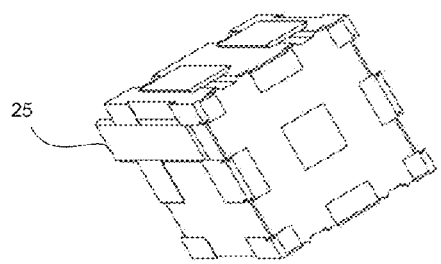
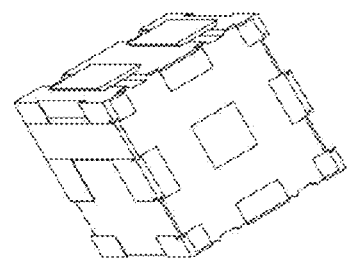
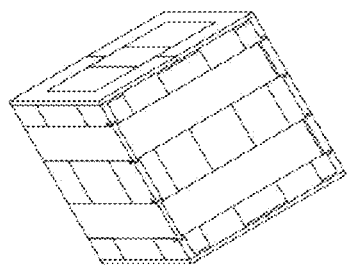
Fig.14

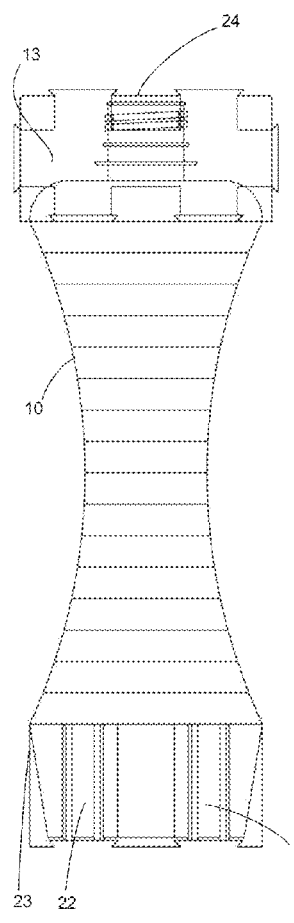 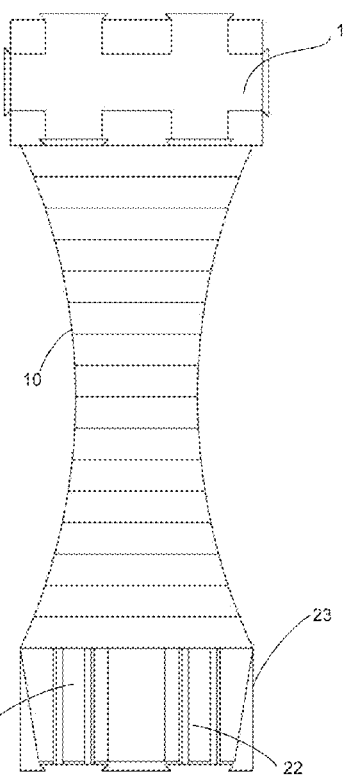 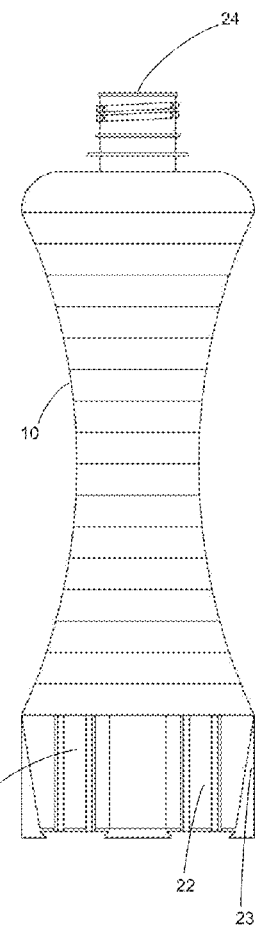
Fig. 15 A      Fig. 15 B      Fig. 15 C

SYSTEM OF COMPACTABLE PACKAGE USABLE AN ASSEMBLY BLOCK, AND A MOUNTED ASSEMBLY

CROSS REFERENCE TO RELATED APPLICATIONS

This application is a national stage application, filed under 35 U.S.C. §371, of International Application No. PCT/BR2011/000126, filed Apr. 29, 2011, which claims priority to Brazilian Patent Application No. PI1001354-7, filed Apr. 29, 2010, both of which are hereby incorporated by reference in their entirety.

BACKGROUND

1. Related Field

The present invention refers to a system of compactable package useable as an assembly block, which enables the reuse of a disposable package of a product whatever and the employ thereof to form an assembly block that can be used to assemble various objects, such as toys, pieces of furniture, popular houses and other structural elements, when coupled to other similar blocks, forming a mounted assembly. The present invention further refers to assemblies formed by said assembling system.

2. Description of Related Art

As it is known, the recycling and reuse of products, besides reducing the impact on the environment, generate work and recover economical value of the recycled or reused material. For this reason, the concern about preservation of the environment and the use of packages that are ecologically correct have become essential and even strategic issues to many companies.

In addition, certifications, as for instance, of the environmental management of the series ISO 14000, somehow attest the environmental responsibility of the activities exerted by a company. The environmental responsibility is fundamental for reducing impacts on the environment in the search for a sustainable development with a view to preservation of the environment. And the practice of ecologically responsible policies and administrations is more and more important for a good image of the companies on the market. In this regard, it is possible to observe more and more concern not only of the companies, but also of people about the recycling or practices of reuse, with a view to reduce the amount of garbage produced.

In the case of selective collection, consumers and companies that make a selection of their garbage do not participate in the complete cycle, being only primary participants of said process, in which there is no certainty that all the products will have an ecologically correct disposal like reuse or recycling thereof. Besides, it is not possible to carry out a selective collection at all places, grouping garbage in an effective manner so that it will be somehow reused. Because of this, in most cases the selective collection has to be accompanied by programs and partnerships with cooperatives in order to make it feasible, which makes the process of disposing urban garbage expensive.

In the future there will be more and more people, companies and products. So, an excessive increase in the amount of garbage will result naturally from the commercialization of industrialized products, as for example packages and bottles.

On the basis of this concern about the environment, there are various types of packages and bottles suitable for recycling, as well specific processes for this. However, the recycling consists of an expensive and often complex process, which consumes resources like electric energy and water and may even be responsible for the generation of residues harmful to the environment.

In addition to companies that propose the reuse or recycling of their products, there are some packages that are already manufactured for reuse or even packages of the retractable type, the volume of which may be reduced after consumption of the product stored therein, with a view to reducing the volume of garbage generated and facilitating the collection thereof.

An example of retractable package that reduces its volume after consumption of the products stored therein is shown in patent document MU 8501905-4, which refers to a pressure-retractable disposable plastic bottle. Said package is provided with a sequence of overlapping peripheral ribs of conical shape, which make the bottle body flexible and, upon receiving a compression stress, tend to accommodate on each other, thus forming a body with reduced volume. With the reduction of the bottle volume, the volume of garbage is reduced, which facilitates the selective collection helps in saving space. However, such decrease does not put an end to the problems referring to collection, since the garbage will continue to exist, only somewhat more compacted. The bottle continues to be disposable, and a small number thereof is recycled after the use. Therefore, this document does not suggest the reuse of a retractable bottle, without the need to subject it to a recycling process.

On the other hand, an example of reuse of package for other purpose than the original one is described in utility-model patent application MU 8202692-0. This Utility Model refers to a modular package used for storing a product whatever, which constituted a module that can be fitted in different manners with other similar packages, functioning as a big assembling toy. Although the idea of the invention has the objective of reusing packages in the form of a fitting toy, it does not have resistance, because it does not have an internal structure capable of bearing stresses, since there is no filling inside the modular assembly. This is because, when the package is reused, it is empty, and its inside is not filled with any additional contents. Thus, these modular packages cannot be used for building objects that require greater rigidity and structural resistance, such as pieces of furniture, walls and structural construction elements.

BRIEF SUMMARY

An objective of the present invention is to provide a package system capable of transforming the packages after use into an assembly block that can be engaged with other similar blocks, thus enabling the reuse of the package to be accessible to any consumer, so that he himself will be responsible for the recycling of the package. The modules can assume different shaped and, as a result, be intended for various applications.

Further, the main purpose of the package system of the present invention is to generate alternatives for using packages, focusing on the part of products that the recycling industry cannot assimilate, chiefly increasing the areas where there is no selective-collection center or processing center, thus preventing, as much as possible, the disposal of garbage and the accumulation thereof at dumping grounds and, at the same time, stimulating the participation and consciousness of the population in the process of reusing garbage.

Finally, it is also an objective of the invention to provide ways of reusing disposable packages that stimulate the development of the user's creativity, which can be employed in popular constructions with inexpensive resources, or even that provide economical gains to the consumers and/or collectors, since they can sell the objects that they can assemble with the reused packages.

The objectives of the invention are achieved by means of a system of compactable package useable as an assembly block, comprising a compressible package and two structural pieces intended for compacting and housing the package, each of which comprises: mutual engagement means, therein the mutual engagement means of one of said structural pieces can be coupled to them mutual engagement means of another structural piece; the means for external engagement being arranged on its outer surface, being engageable with at least one external piece provided with compatible engagement means; wherein at least one of the structural pieces has retention means arranged in the inner cavity for retaining the package inside said two structural pieces and, when the package is in the compressed state, the structural pieces are fitted into each other and locked with each other by the mutual engagement means, forming an assembly block containing the package inside the cavities of the structural pieces.

Alternatively, one of said structural pieces consists of an internal structural piece with the mutual engagement means arranged on its outer surface, and the other of said structural pieces consists of an external structural piece with the mutual engagement means arranged on its inner surface, wherein, when the structural pieces are mutually engaged, the external structural piece overlaps, at least partly, the internal structural piece.

The mutual engagement means may comprise a protrusion on the outer surface of the internal structural piece and a recess in the inner surface of the external structural piece, the recess fitting under pressure into the outer protrusion of the internal structural piece.

The retention means on the package may comprise a plurality of flexible locking flaps, fixed to the inner surface of at least one of the structural pieces, exerting interference pressure on the outer surface of the package. Alternatively, at least one of structural piece provided with retention means for the package may have deformable walls that bulge into the cavity when the structural pieces are fitted into each other, forming bulging that exert interference pressure on the package.

The internal engagement means of an assembly block are can be coupled to the engagement means of another assembly block. Besides, the system may further comprise at least one additional engagement piece coupled to the external engagement means of at least one of the structural pieces. The additional engagement piece is coupled to at least one end of a carrying strep.

Preferably, the structural pieces have a shape with a polygonal cross section, and at least one of said structural pieces is provided with internal engagement means on each of its outer surfaces. The system may comprise two different types of external engagement, which have complementary shapes that can be coupled to each other, each face that constitutes the polygonal cross section of a structural piece being provided with a type of internal engagement other than the type of external engagement arranged on the faces laterally adjacent to it.

The coupling pieces are preferably constituted by a material selected from the group consisting of a rigid polymer, aluminum, wood, brass, resin, and anti-flame materials, among others.

The objectives of the invention are also achieved by a mounted assembly comprising a plurality of systems of compatible package that can be reused as assembly block, of the type described herein, wherein each of the assembly blocks is coupled with at least one further assembly block by its respective internal engagement means. The mounted assembly comprises blocks with two different types of external engagement means, which have complementary shapes that can be coupled to each other, all the engagement means of the same assembly block being identical to each other.

Finally, the objectives of the invention are still achieved by means of a mounted assembly comprising a plurality of systems of compactable package that can be reused as an assembly block, of the type described herein, each of the assembly blocks being coupled to at least one other assembly block by means of their respective external engagement means, and each of the assembly block comprising two different types of external engagement means.

Alternatively, all the blocks of the assembly have the same type of external engagement means on each face, the external engagement means comprising a negative engagement on one side and a positive engagement on the other side, the negative engagement having a shape that can be coupled to the positive engagement.

BRIEF DESCRIPTION OF THE FIGURES

The present invention will now be described in greater detail on the basis of an example of embodiment represented in the drawings. The figures show:

FIG. 1A shows front and side vies of a system of compactable package that can be reused as an assembly block according to first embodiment of the invention, with the package in the expanded state, wherein the structural pieces are coupled to the lower part of the package, one overlapping the other;

FIG. 1B shows front and side views of a system of compactable package that can be reused as an assembly block according to second embodiment of the invention, with the package in the expanded state, one of the structural piece being coupled to the lower part of the package, and the other being coupled to the upper part of the package;

FIG. 6A shows two top view of an external structural piece with external engagement means on the side faces according to an embodiment of the system of the invention;

FIG. 6B shows two bottom views of the structural piece of FIG. 6A;

FIG. 6C shows two side views of the structural piece of FIG. 6A;

FIG. 6D shows a top view of another external structural piece with rounded corners;

FIG. 6E shows a view in detail of an outer corner of the piece illustrated in FIG. 6D with rounded corners;

FIG. 8A shows a front view of an embodiment of the package system according to the invention, with the package in the expanded state, and with a polygonal cross section, having two different types of external engagement means on alternating faces;

FIG. 8B shows a side view of the package system illustrated in FIG. 8A, showing on the lower structural piece a different type of external engagement means, complementary to the external engagement means shown in FIG. 8A;

FIG. 8C shows a top view of another embodiment of the package system with both pieces having triangular cross section, with the same type of external engagement means on all the side faces;

FIG. 8D shows a top view of another embodiment of package system, with both structural pieces having hexagonal cross section with two different types of external engagement means on alternating faces;

FIG. 8E shows a top view of another embodiment of the package system with both structural pieces having octagonal cross section with two different types of external engagement means on alternating faces;

FIGS. 9A to 9D illustrate examples of application of the modular system in question, coupled to additional fitting pieces and/or to other assembly blocks, forming toys;

FIG. 14 shows the view of a sequence of applications of finish rules to assembly blocks used as building blocks; and FIG. 15A to 15C shows an alternative embodiment of the invention using only one structural piece to form an assembly block.

DETAILED DESCRIPTION OF VARIOUS EMBODIMENTS

Figure 2:
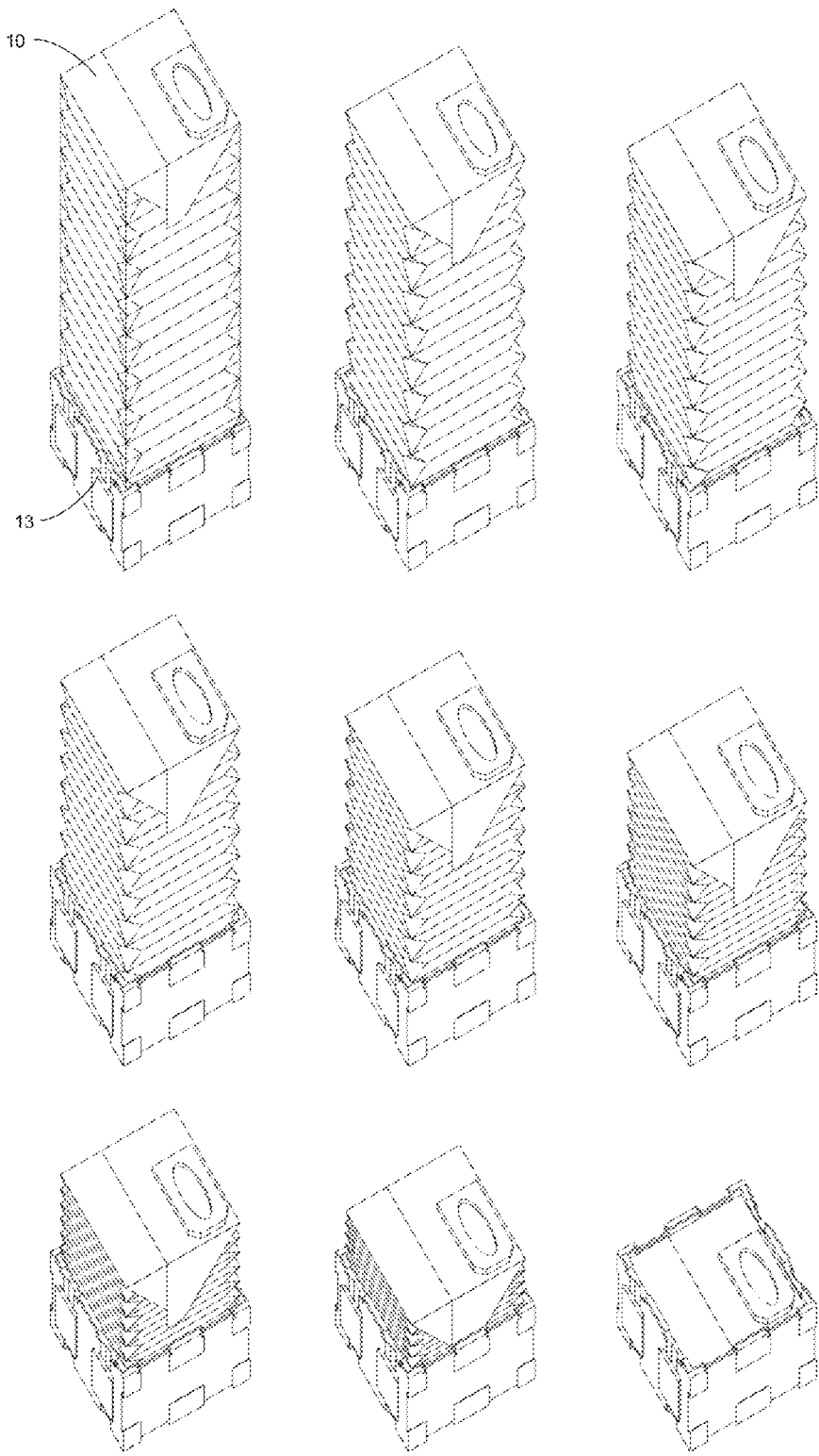
FIG. 2 shows the system of compactable package that can be reused of FIG. 1A, identifying a process of compressing the compressible package until it is housed inside one of the structural pieces.

FIGS. 1A and 1B show the front and side views of two embodiments of the system of compactable package that can be reused as an assembly block of the present invention. As can be seen in both figures, the package system comprises a compressible package 10, usually a disposable package used for carrying a product, and that would be thrown away after consumption of the whole product contained therein. In these two preferred embodiments of the invention, one uses particularly packages retractable packages of varying volumes, which have such an structure that enables them to be compressed by elastic deformation or still by plastic deformation without the need for any auxiliary instrument for deformation/compression, so as to reduce their volume. As examples of retractable packages, one can use concertina-type carton packages or PET packages, that is, provided with creases and folds, so that when the package is full it will be completely stretched upwards, and as the package empties it is enough to press its top slightly downward in order to compress it, as shown in FIG. 2. However, still within the scope of the present invention one can use compressible packages that require some kind of plastic deformation and more force, and possibly additional tools for compacting them, such as, for example, aluminum cans. Packages intended for foodstuffs, cosmetic, hygiene, cleaning products, or any other type of disposable may be used.

Figure 3:
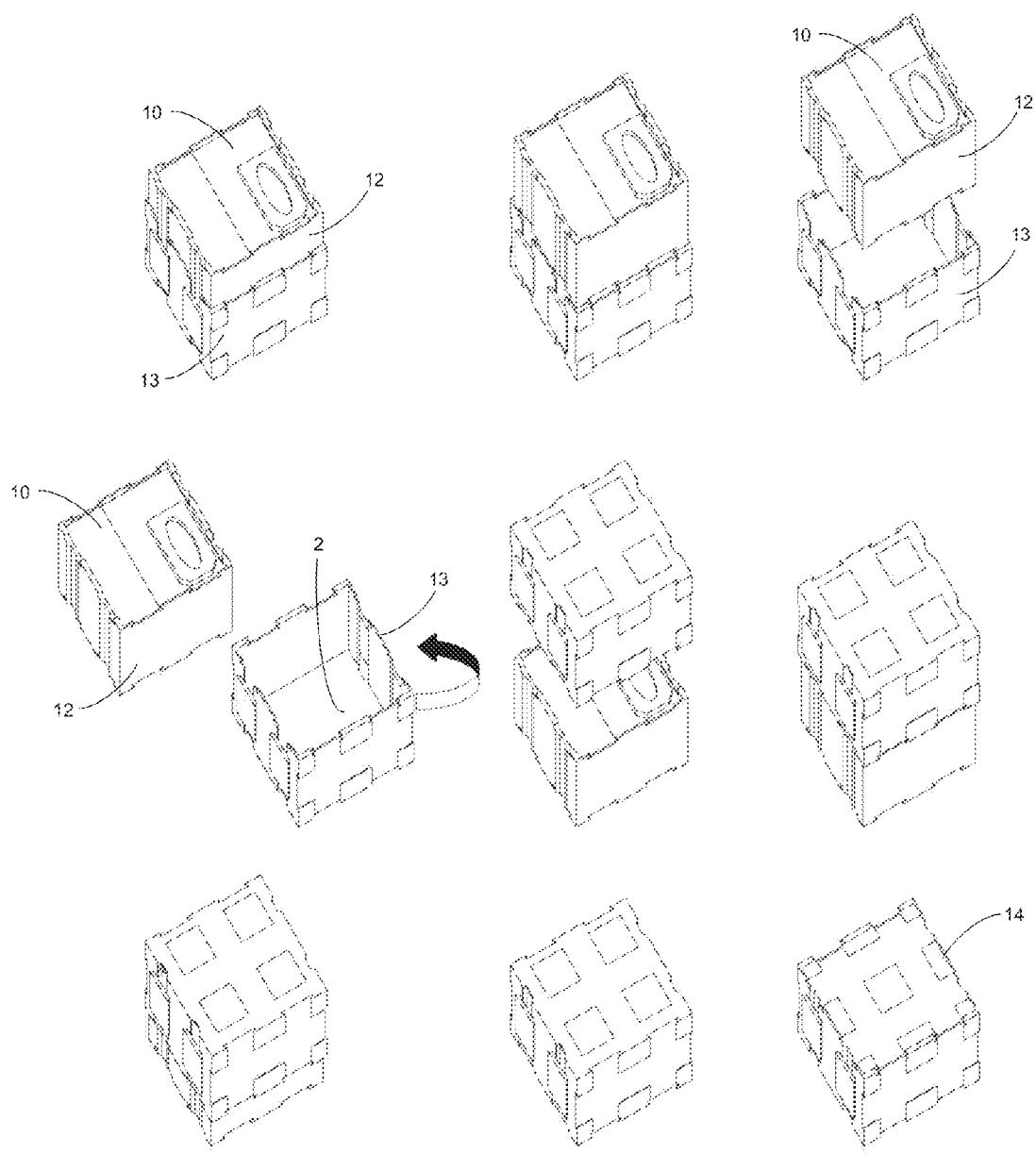
FIG. 3 shows the sequential functioning of an embodiment of the package system according to FIG. 1A, to form an assembly block.

According to an embodiment of the invention, the system further comprises two structural pieces 12, 13 for compaction and housing of the package, inside which the package 10 will be housed after being compressed. These two structural pieces 12, 13 have an inner cavity 2 for housing the package, more clearly shown in FIG. 7. Thus, when the package is compacted, it is housed inside the cavities 2 of the two structural pieces 12, 13, the structural piece 12 being coupled from below, and the other structural piece 13 being coupled from above the package, forming an assembly block 14 enclosing the whole package compacted inside it, as shown in FIG. 3, at the end of the compacting process. The assembly block 14 is a massive block with the package 10 functioning as an internal supporting structure and providing greater resistance to it.

According to the invention, the structural pieces 12, 13 are preferably constituted by one from the following materials: a rigid polymer, such as PET, aluminum, wood, brass, resin, among others that are capable of meeting the functionalities which the invention proposes to provide. These pieces, when used for forming building blocks, for instance, forming a house structure, are preferably constituted by anti-flame material, flame materials or materials that do not burn. Examples of anti-flame materials that may be sued in this application are BHDB (bis-hydroxydeoxy-benzoin), plastic based on polylactic acid, among others.

The systems according to the invention are, in general, carried with packages filled with some consumable product and, therefore, in expanded state. Thus, the package systems can be carried with two structures fitted into each other, coupled to the bottom part of the package, as shown in FIGS. 1A and 2. When the package is empty, it will be compressed in a sequence of movements, as shown in FIG. 2, and then one of the structural pieces that is arranged on the outside will be decoupled from the bottom part of the package and re-coupled from above in inverted position, as shown in the sequence of illustrations of FIG. 3, forming an assembly block 14.

Alternatively, the package systems may be carried with the structural piece 12 already coupled from the below the package, and the other structural piece 13 coupled from above the package, as shown in FIG. 1B. In this case, the functioning is more simple. It is sufficient for the package to be compressed, in order for the structural pieces to engage with each other and form the structural block.

The structural pieces also comprise mutual engagement means, which serve to couple one structural piece to the other in a locking manner, when the package is in compressed state, forming the assembly block 14. These mutual engagement means may be in the form of any type of fitting that can provide engagement and preferably also the locking between the two structural pieces, imparting stability and structural resistance, a perfect form-locking closure, male-and-female engagement, threaded engagement, adhesive coupling or even closure by magnetism, among others. Mutual engagement means may be located at the borders of the structural pieces, in the embodiments of the invention in which these pieces engage border with border, or still over the inner and outer peripheral surfaces of the pieces, when they are engaged in such a way that a piece overlaps the other at least partly.

In the embodiment of the invention shown in FIG. 3, for instance, the structural pieces that integrate the package system consist of an external upper structural piece 13 with the mutual engagement means arranged on its inner surface, and an internal lower structural piece 12 with the corresponding mutual engagement means arranged on its outer surface. When the structural pieces are mutually engaged, the external structural piece 13 overlaps the internal structural piece 12 totally, the retractile package being stored in a compressed form inside them. In this embodiment of the invention, the mutual engagement means are constituted by a protrusion 19 at the upper border of the outer surface of the internal structural piece 12, and a recess 20 in the bottom of the inner surface of the external structural piece 13, this recess 20 engaging under pressure with the external protrusion 19 of the internal structural piece 12, when the two structural pieces are engages overlapping each other. In this way, the two structural pieces 12 and 13 remain engaged in a locked manner, forming an assembly block, the structural support and resistance of which are ensured also by the compressed package occupying the inner cavity of the block. In this embodiment of the invention, the assembly block formed has greater rigidity and structural resistance by virtue of the overlapping between the two pieces 12, 13.

Alternatively, the structural pieces 12, 3 may have walls with peripheral borders in the form of complementary peaks and valleys, so that when the two pieces meet the peaks of one piece will fit into the valleys of the other piece. In this embodiment, the engagement between the pieces is made easy, since it is not necessary to insert one structural piece into the other.

In addition, the structural pieces 12, 13 of the package system have external engagement means arranged on their outer surface. These engagement means serve help the various similar assembly blocks to be connected together, forming larger structures, or still to connect the blocks with different additional engagement pieces provided with compatible means, in order to build toys and other objects which one desires, as shown in FIGS. 9A to 9D. The external engagement means may be of any nature that enables the assembly blocks to be coupled to each other with the rigidity and resistance required for the type of application in which they are used. For instance, in the case of assembling toys, the rigidity and coupling resistance should be lower than in cases of assembly blocks used for civil construction, or for furniture structures. As examples of type of external engagement, one may use magnetic engagements and couplings, male-and-female type engagements, pressure engagement, threaded engagement, adhesive coupling, among others.

A possible embodiment of the external engagement means according to the invention is shown in details in FIGS. 6A to 6C and 7A, which illustrate the external structural piece according to an embodiment of the invention. In the outermost left illustration of FIGS. 6A and 6B, the external structural piece 13 is represented with an internal structural piece 12 fitted inside it. In the outermost right the illustrations of FIGS. 6A and 6B, the external structural piece is shown alone. In FIGS. 6A and 6B four hatched regions are shown, forming trapezoidal spans 28 close to the border of the structural piece 13. These trapezoidal spans indicate a space formed close to the side walls of these structural pieces 13, even when the external piece and the external piece are engaged, intended for engagement of the vertical rods 29 of support pieces shown in FIG. 12, which serve to couple a number of packages, forming a multi-pak assembly. For this purpose, it may be necessary to provide a cut-out in the shape of the trapezoidal spans 28 in the surface of the internal and/or external structural pieces, through which the vertical rods of the support piece may pass, when coupled to the package.

Figure 7A:
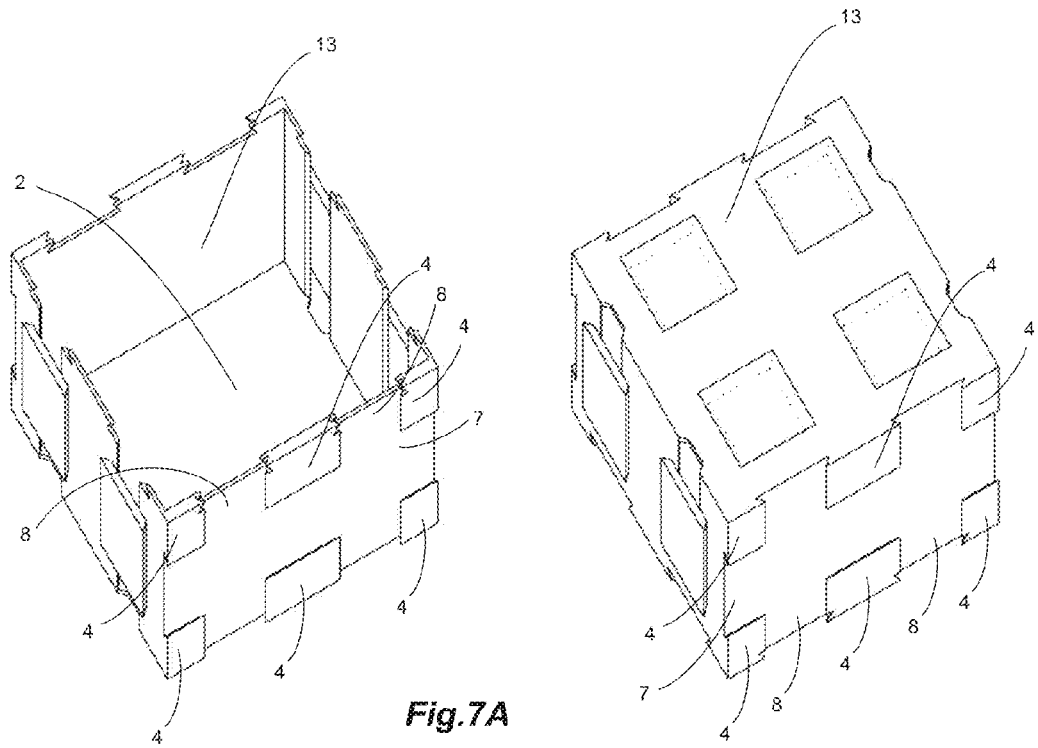
FIG. 7A shows a perspective top view and a perspective bottom view of the external structural piece illustrated in FIGS. 6A to 6C.

In FIGS. 6A and 7A, which show the upper and perspective views of this embodiment of the external structural piece, one can see that the front and back faces have first type or profile of external engagement means on the outer surface, while the left and right side faces have second type of external engagement means, wherein the second and the first types of external engagement means can be coupled to each other.

In FIG. 6A on the left, the first type of engagement means is shown frontally in detail. These engagement means are formed by six shoulders 4 arranged around the borders of the external front face, the shoulders joining the face of the structural piece, forming a groove with a V-shaped profile 6, as shown in FIG. 7A in a better way. Besides, the shoulders are arranged so as to form a horizontal rail 7 and two recessed vertical rails 8.

FIG. 6C on the right shows the second type of engagement means of the side faces, which are constituted by two squares 5 that stand out with respect to the outer face of the structural piece, also forming a V-shaped groove 6' identical to the groove 6 formed by the shoulders 4 of the first types of engagement means. The squares are sized so that they can slide on the vertical 8 and horizontal 7 rails formed by the first type of external engagement means, by sliding engagement between the respective grooves 6 and 6'. In this way, in order to engage two identical assembly blocks, it is enough to slide, in horizontal or vertical direction, a face with the first type of engagement of a first block against a face with the second type of engagement of a second block.

Figure 5A:
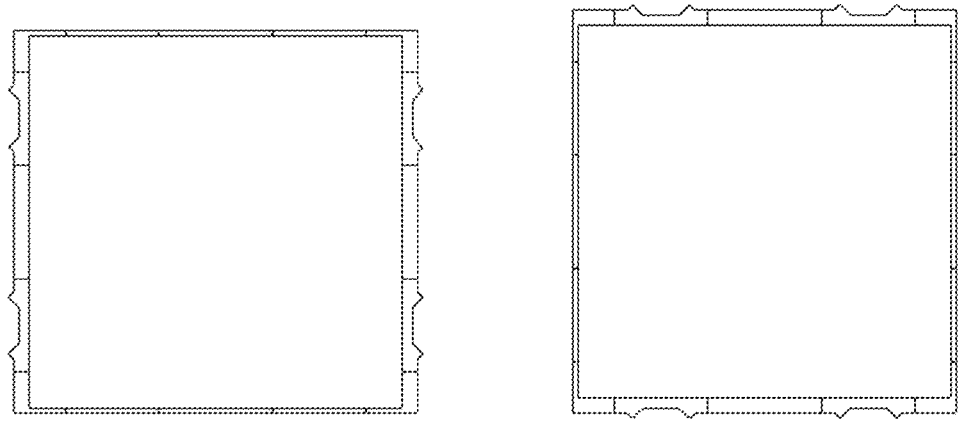
FIG. 5A shows a top view of one internal structural piece with external engagement means—which serve as engagement for the vertical rods present in FIG. 12 (A-B-C-D-E-F)—on the side faces according to an embodiment of the system of the invention.
Figure 5B:
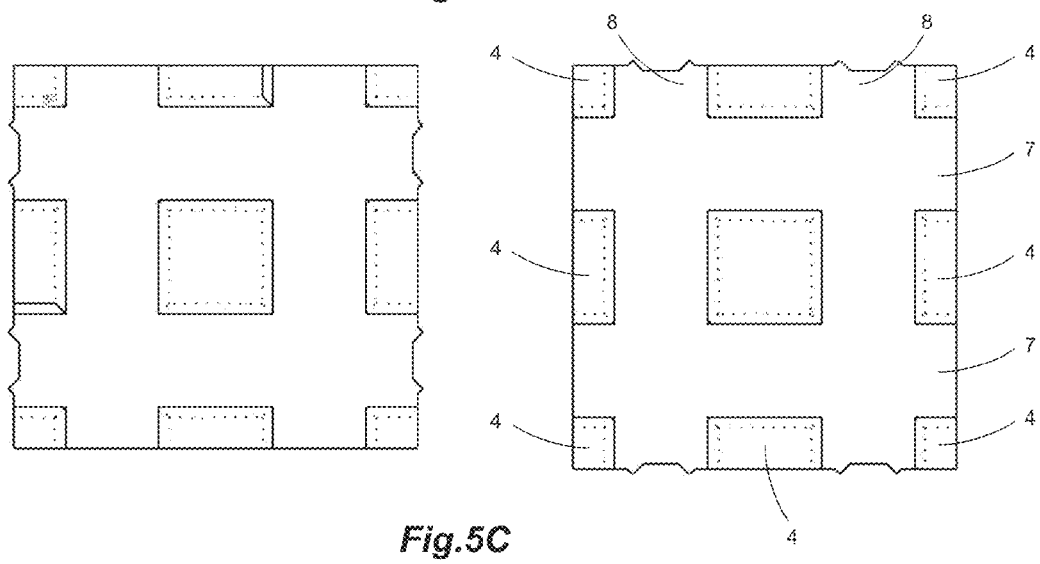
FIG. 5B shows a bottom view of the structural piece of FIG. 5A.
Figure 5C:
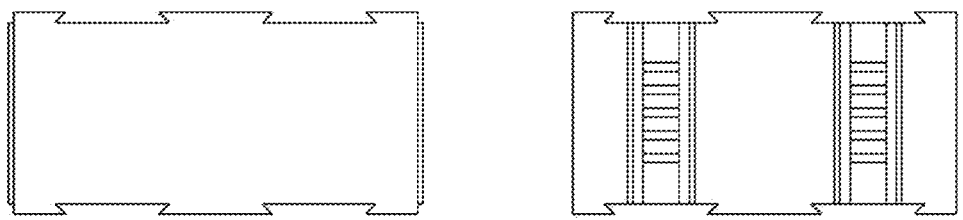
FIG. 5C shows two side view of the structural piece of FIG. 5A.

Besides the side walls, the upper and lower outer faces of the structural pieces are also provided with complementary engagement means, shown in detail in FIGS. 5B and 6B, which may also be in the form of recessed rails 7, 8 and shoulders 4, and squares 5 that stand out, of the type shown in these figure, or another shape whatever that enables engagement between similar assembly blocks. FIG. 6D shows a top view of a structural piece according to the invention that is designed with all its corners rounded. FIG. 6E shows, in larger details, the shapes of the piece corners. This embodiment of the structural piece is suitable for use by children, since the live edges were eliminated, in order to eliminate the risk of children getting hurt or suffering slight wounds.

Figure 7B:
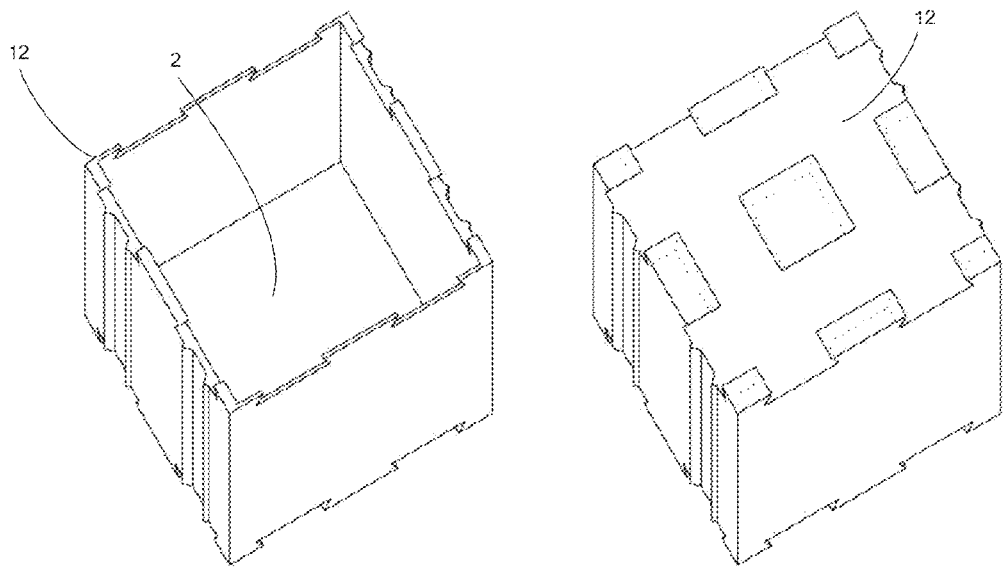
FIG. 7B shows a perspective top view and a perspective bottom view of the internal structural piece illustrated in FIGS. 5A to 5C.
Figure 7C:
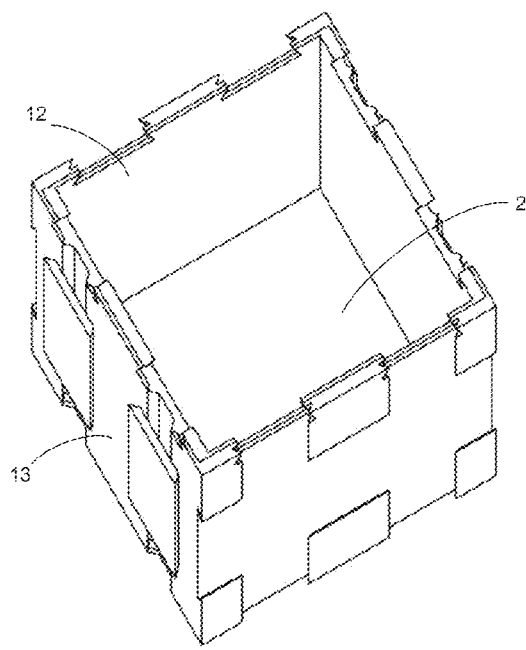
FIG. 7C shows a perspective top view of the internal structural piece and of the external structural piece fitted into each other, one inside the other.
Figure 7D:
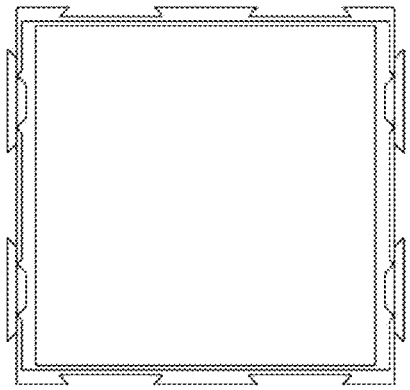
FIG. 7D shows a top view of the internal structural piece and of the external structural piece fitted into each other, one inside the other.
Figure 7E:
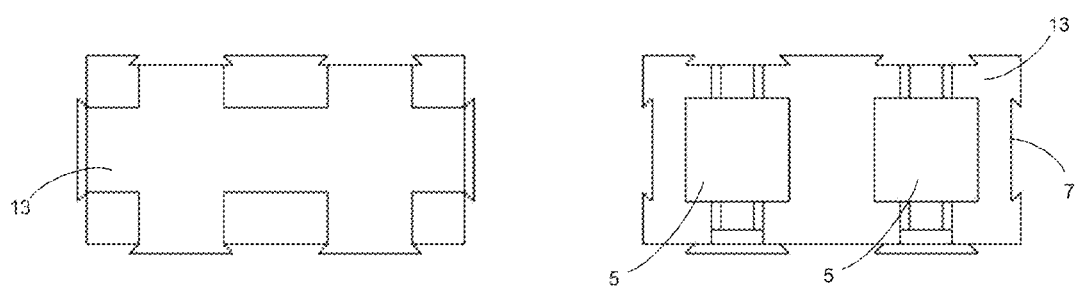
FIG. 7E shows two side view of the internal structural piece and of the external structural piece fitted into each other, one inside the other.

Preferably, the lower face of the structural piece 12 that remains engaged from below the package should have first type of engagement means, while the upper face of the structural piece 13 that remains engaged from above the package should have second type of engagement means, this engagement being complementary with respect to the first type of engagement means, as can be seen in FIGS. 7A and 7B, which show lower and upper perspective view of the external and internal structural pieces, respectively. One can observe that these faces of the outer and inner faces of the structural pieces can couple to each other by mutual sliding.

Thus, one can couple a number of similar assembly blocks 14 in the vertical direction and in the horizontal direction simultaneously, forming a wall or a cube, for example. FIGS. 7A and 7B show perspective views of the external and internal structural pieces 13 (FIG. 7A) and 12 (FIG. 7B) of the assembly block 14 formed by the package system according to the present invention, provided with external engagement means on their side, top and bottom faces, in order to couple to other similar assembly blocks, and also mutual engagement means for the to couple to each other in a locked manner.

Figure 13:
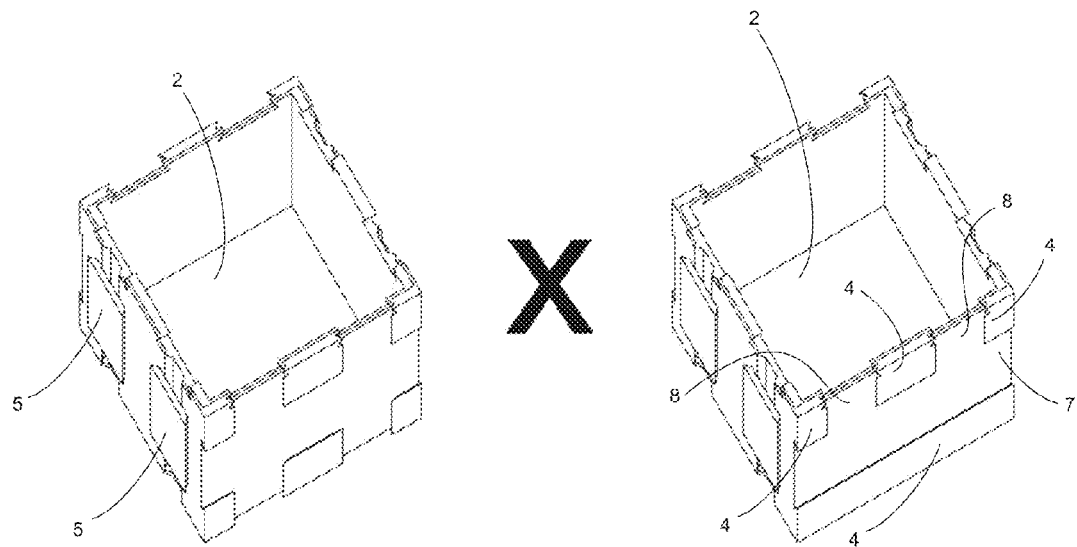
FIG. 13 shows a comparison between a package system with continuous engagement and a package system with discontinuous engagement.

In FIG. 13 on the right, one shows another alternative form of external engagement means that may be applied to the structural pieces. In this embodiment of the invention, one uses engagement means of the locked type, which enable discontinuous engagement between two similar blocks and greater locking resistance. On the side face of the block, four shoulders 4 are arranged, three of which being adjacent to the upper border, and one bigger shoulder extending horizontally throughout the lower border of the face. In this way, one forms a horizontal rail 7 throughout the surface, and only two entrances of vertical rails 8 from the upper border. Thus, when the two squares 5 on the side face of a block are pushed through the entrances of vertical rails on the side face of the other block, the vertical slide movement is limited and interrupted by the horizontal shoulder, thus preventing the two blocks under pressure from sliding vertically and coming out of position later. Alternatively, in an embodiment of the invention (not shown), one may further provide stops or side shoulders at the side ends of the horizontal rail, which would prevent relative displacement between the engaged blocks in the horizontal direction as well.

From the structural pieces 12 and 13 that integrate the same package system, at least one of them should be provided with retention means arranged in the internal cavity, for retaining the package inside the two structural pieces, when it is in expanded state and in compressed state. Preferably, these retention means are foreseen on the structural piece that is arranged the innermost, when there is overlapping of the two pieces in the coupling between them to form the assembly block. However, the retention means may be also provided only on the upper structural piece 13, or only on the lower structural piece 12, or on both of them.

Figure 4:
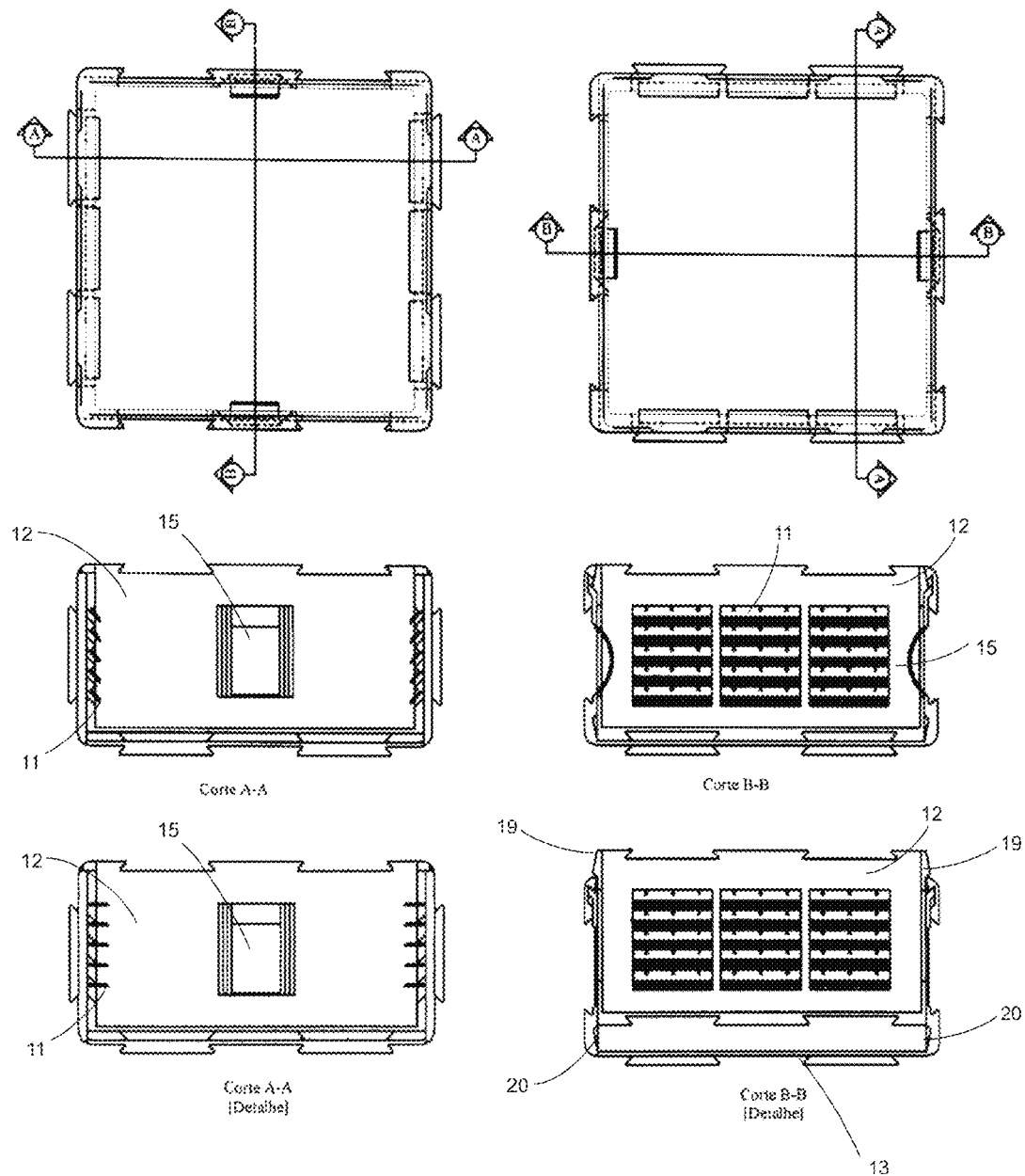
FIG. 4 shows, in top views and cross section, a few embodiments of retention means of the package inside the structural pieces of the system according to the invention.

FIG. 4 illustrates a possible embodiment of the retention means according to the invention. In this embodiment, a plurality of flexible locking flaps 11 are fixed to the inner surface of the lower structural piece 12, preferably in a horizontal orientation. Since in this example the structural piece 12 has a square shape, the flaps 11 are arranged in two opposite inner faces of the structural piece, and by also be arranged on the four inner faces. The flaps should have a length such as to exert pressure by interference against the surface of the package, when it is in expanded state or in compressed state. Besides, when the package is in the compressed state, these flaps can help in keeping it in this way, for instance by coming into the creases formed on the compressed package, so as to prevent it from expanding again and exerting pressure on the upper structural piece 13, causing the two structural pieces to disengage and the assembly block to detach.

When the structural pieces have another shape, the flaps should be arranged preferably on at least two faces or different regions of the inner cavity 2 of the structural piece, so as to be capable to retain the package inside this structural piece, in both expanded and compressed states. The flaps may also be continuous, extending horizontally throughout the surface of the cavity of the structural piece.

The flaps are preferably flexible, so that when the package is first inserted into the structural piece, these flaps will curve downward under the pressure of passage of the package, without damaging its body, but being capable of exerting retention pressure on it.

Alternatively, the retention means may be formed by deformation 15 of the wall itself that constitutes the structural piece, as shown in FIG. 4. In this embodiment of the invention, the innermost structural piece (in this case the lower piece 12) should have at least two through-bored walls, so as to allow part of the wall of the structural piece 13 to deform elastically inward it, exerting pressure on the package while locking the assembly. In this way, when the external structural piece 13 is engaged onto the internal piece 12, the deformable walls form bulging 15 inward the internal cavity 2, in the direction of the package body, and exerting interference pressure on the package, so as to retain it inside the cavity 2. The structural piece may have two or more walls with the characteristics described herein, capable of forming the retention means of the package.

According to the invention, the structural piece may be provided with only one of these retention means (retention flaps 11 and bulging 15), or still with both these retention means simultaneously, on alternating walls, or combined on the same wall or in the same region of the internal cavity of the structural piece. The combination of various retention means on the structural pieces enables the package to be retained in a more effective manner inside the structural pieces.

However, the present invention is not restricted to these forms and types of retention means other retention means of the package may also be provided, such as elements that act on the upper region and cover of the package. For instance, the internal cavity of the upper structural piece may be molded so as to engage over PET-bottle caps, which usually have the same diameter or still over the top of carton packages of parallelepiped shape. The arrangement of retention means on the upper structural piece 13 is particularly important when this piece is used to aid in compressing the package. Or still the cavity of the lower structural piece 12 may be molded so as to engage with the shape of PET bottles, or of aluminum cans.

Alternatively, the package may also be fixed to the upper and/or over cavities of the structural pieces by means of simple grooves or even by gluing. For instance, in an alternative embodiment the package may be glued to one of the structural pieces and engaged by retention means to the other structural piece, or even be glued to both structural pieces.

According to an alternative of the invention, shown in FIGS. 15A to 15C, the system comprises only a single structural piece 13, coupled to the upper part of the package. In this embodiment, the lower structural piece is dispensable, since the lower region of the package itself is adapted for performing the function of the lower piece. In this case, the use of materials is limited, as the package performs the role of engagement. As shown in FIGS. 15A to 15C, the upper structural piece 13 may be fixed, through its retention means, to the package cover, in the case of PET bottles that have a prominent cover. FIG. 15A shows a schematic front view in which the cover of the PET bottle is represented from inside the structural piece 13, only for understanding the invention. FIG. 15B represents a more real font view of the PET bottle with the structural piece 13 coupled to the neck 24 of the bottle, functioning as a cover. In this case, the structural piece 13 is internally provided with a thread compatible with the neck 24 of the PET bottle. Alternatively, the structural piece 13 may also be coupled to a cover of PET bottle, instead of functioning as a cover proper.

The structural piece 13 further has corresponding mutual engagement means (not shown), shaped in the lower region 23 of the bottle. This same embodiment of the invention may also be applied to carton packages, as long as engagement profiles are coupled to its surface.

According to this embodiment of the invention, the upper structural piece 13 should then be provided with retention means so that it can remain secured to the upper part of the package. Besides, the upper piece should have mutual engagement means on its inner surface. These mutual engagement means will be engaged with the corresponding engagement means 22 formed on the outer surface of the lower region 23 of the package, when said package is in compressed state. In this way, the package remains housed inside the internal cavity of the upper structural piece 13, and only its lower face will be turned out of the cavity.

By this embodiment of the invention, one eliminates the need for a lower structural piece and reduces the consumption of material. Preferably, in these cases, the lower region of the package should be reinforced to provide the structural resistance necessary to the assembly block that will be formed.

A preferred form of mutual engagement according to this embodiment of the invention is shown in FIGS. 15A to 15C. Along the inner surface of the upper structural piece 13 are formed vertical protrusions (not shown) that constitute its mutual engagement means, and in the lower region of the package 23 are formed vertical grooves 22 of shape analogous to that of the protrusions, forming the corresponding mutual engagement means, and along which the protrusions slide. In this way, when the retractile package is emptied from contents, the upper structural piece 132 is pressed toward the package bottom, thus compressing the package until the upper structural piece 13 overlaps the lower region of the package and slides on the vertical grooves, thus forming the assembly block 14. This region of the package 23 where the grooves are provided may not be retractile. Preferably additional mutual engagement means are provided, which provide the locked and more secure fixation between the upper structural piece and the package bottom, in order to prevent this package from expanding and dismounting the assembly block. For this purpose, one may provide locks or pressure, contact, toothed or magnetic catches, or any other type, may be provided.

In the same way as in the other embodiments of the invention described herein, in this case too one provides, on the outer faces of the upper structural piece 13, the external engagement means for engagement with other assembly blocks. In FIGS. 15A to 15C the upper pieces 13 are shown with a square profile and two different types of engagement. However, they may also be manufactured with only one type of engagement and with profiles of other shapes. The models of pieces with two different types of engagement, or with only one type of engagement will be described in detail later with reference to FIGS. 8A to 8E.

The embodiment of the invention using only one structural piece 13 may also be foreseen with this piece 13 originally coupled to the lower region 23 of the bottle through the corresponding engagement means 22, while the bottle is full and/or its content is being consumed. In this case, the structural piece 13 does not need to function as a cover. After the package has been emptied, the structural piece is coupled to its upper part, and the package is compressed, until the structural piece 13 overlaps and engages the lower region 23 of the bottle, forming the assembly block.

These structural pieces of the package system may also be carried in a generic shape, capable of retaining any type of package, be it rounded or polygonal, and regardless of its material and, therefore, they should be provided with equally generic retention means, which adapt to various types of packages, as is the case of the flaps 11 and of the bulging 15.

The structural pieces may have a shape with any polygonal cross section, so as to adapt to different types of package. FIGS. 8A to 8E show top view of structural pieces with different shapes, with triangular, hexagonal and octagonal cross section, respectively. They are preferably provided with external engagement means on each of the outer faces that compose a cross section (lateral outer faces), as well as on the upper or lower outer face, to enable the largest number of couplings possible. However, these structural pieces may take on other irregular shapes, with sides of different sizes, as long as they enable coupling between several assembly blocks with similar external engagement means.

According to an embodiment of the invention showed in FIG. 8C, when the structural piece or assembly block has an odd number of side faces, preferably all these side faces remain exposed when the package system is in the form of an assembly block should have the same type of external engagement, that is, all their external engagement means of the block are identical. In this way, for coupling between there packages and other similar ones, there are two alternative. In the alternative shown in FIG. 8C, the external engagement has a shape with a conjugated system, having on the same face a negative engagement on the one side and a positive engagement on the other side. In this way, identical faces may be engaged with each other, but the engagement should be unidirectional, that is, the left side (positive) of a face of a block is engageable with the right side (negative) of the face of the other block and vice-versa. This type of external engagement with conjugated system may evidently be applied to blocks with an even number of faces.

In another alternative for block with odd number of faces, one should put on the market two versions of package systems, each of the versions containing only one type of different external engagement means, but the two types of engagement should be engageable with each other. Therefore, the assembly formed by the coupling of a plurality of package systems will necessarily have two versions of the block, each version containing only one of the two different types of external engagement means. This embodiment of the invention that requires two different versions of the package system may naturally be used for assembly blocks with an even number of side faces. Each company owning this type of package may sell packages having engagements of exclusive shapes so as to foster the trust of the consumer.

On the other hand, the structural pieces that have an even number of side faces, as shown ion FIGS. 8A, 8B, 8D and 8E, are preferably provided with two different types of engagement means, which are complementary an engageable with each other. The two types of engagement are arranged on alternating faces, so that each side face of the same structural piece is provided with a type of external engagement means different from the other type of external engagement means exposed on the two faces laterally adjacent to it. In this way, all the package systems and assembly blocks put on the market may be identical, since for engaging two block with each other it is enough to connect a side face of a block having first type of external engagement with a side face of another block having second external engagement, that is, it is sufficient to position the two blocks so that the complementary faces will be engaged. In the same way, the assembly formed by coupling a plurality of package systems may be constituted only by identical blocks and possibly additional engagement pieces.

Further within the scope of the present invention, one may form assemblies constituted by blocks of different shapes, for instance, by combining triangular, square, rectangular, pentagonal, rounded blocks, or still blocks having irregular profiles. Is only necessary that these blocks have external engagement means that are compatible with each other and enable coupling between these pieces. In this case, the application of a format of external engagement with conjugated system, wherein the faces of all the blocks have the same type of engagement with a negative engagement of one side and a positive engagement with the other side facilitates the coupling between all the types of blocks having different numbers of faces.

The possibility of mutual coupling between similar structural pieces of similar package system enables, among other things, commercialization of various packages together, as by means of a bottle crate, or a multi-pak package. In the example shown in FIGS. 11A and 11B, nine packages filled with product re shown in the expanded state. In this case, it is advantageous to couple one strap to the set of packages, so that they can be carried together. For this purpose, it is possible to engage, with one of the package systems arranged at one of the ends of the set of packages, an additional engagement piece 9 for coupling of one end of a carrying strap 18. This additional piece 9 may be constituted, on the one side, by engagement means compatible with the external engagement means of the package system, and on the other hand by a securing ring or hook for securing the strap or any other element intended to fasten the package system. The securing ring or hook itself may have, at one of its ends, some type of engagement for the package system. Other examples of additional engagement pieces may be locking systems, carrying straps, devices for displaying advertisements.

Figure 11A:
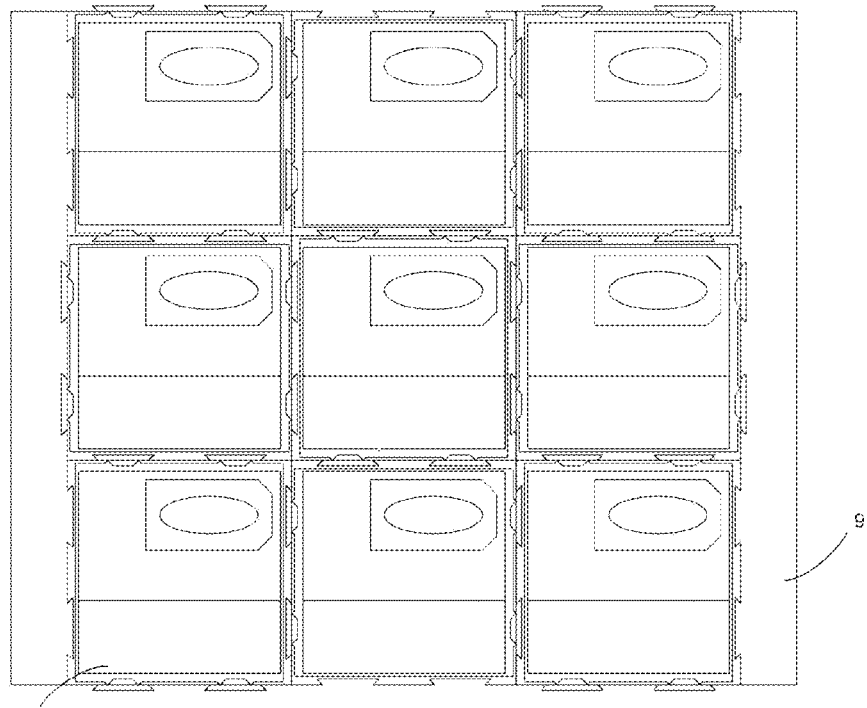
FIG. 11A shows a top view of nine assembly blocks according to the invention, connected together, forming a type of multi-pak bottle crate, which can be carried all together.
Figure 11B:
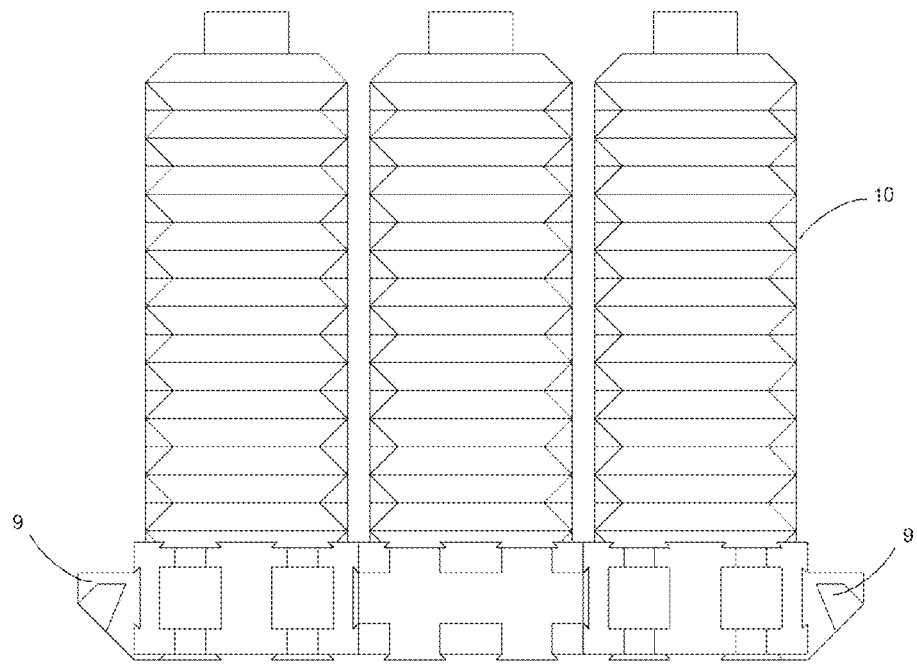
FIG. 11B shows a side view of the nine assembly blocks according to the invention illustrated in FIG. 11A.
Figure 12A:
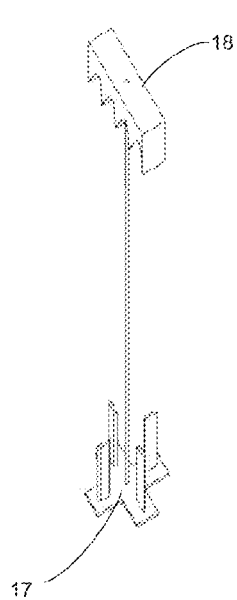
FIG. 12A to 12F show examples of additional support pieces that help in carrying a number of assembly block together, as shown in FIGS. 11A and 11B.
Figure 12B:
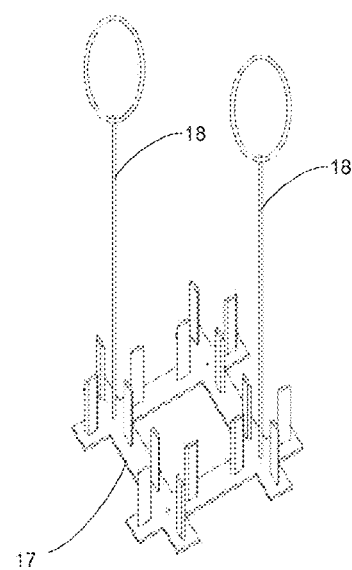
Figure 12C:
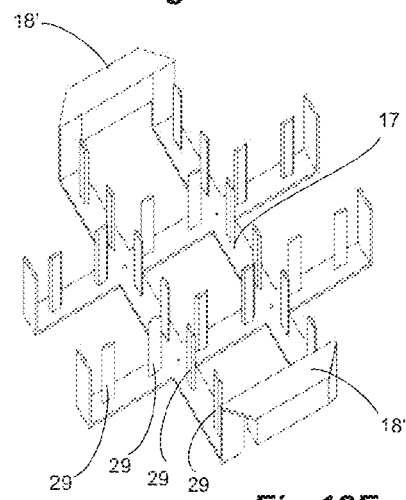
Figure 12D:
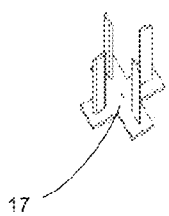
Figure 12E:
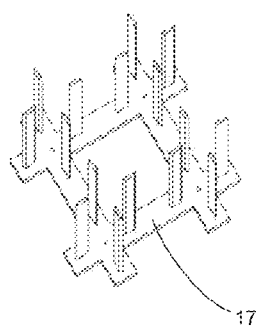
Figure 12F:
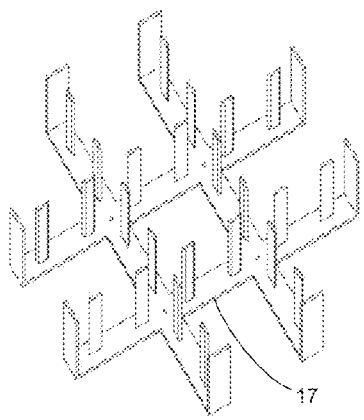

FIGS. 12A to 12F show a few types of additional support pieces 18, which may be coupled to the multi-pak package assembly of FIGS. 11A and 11B, to facilitate transportation thereof. These pieces have a horizontal support base connected to a plurality of small vertical rods 29, which fit into trapezoidal spans 28 formed close to the side walls of the structural pieces 12 and 13. Each package system having two structural pieces 12 and 13 and one package 10 is traversed in their trapezoidal spans (see FIGS. 6A and 6B) by four vertical rods 29 that serve as support for the lower structural piece of the package system applied to each of the packages of the multi-pak assembly—imparting to the assembly with greater cohesion and resistance, including cases where it is dropped. In this way, these additional support pieces are fitted from below the multi-pak assembly, so that the vertical rods will remain exposed between the packages. In FIGS. 12A and 12B, carrying straps 18 are fixed to the horizontal support base 17, and extend vertically as far as the height that enables them to stand out over the packages, in order to enable the multi-pak assembly to be carried by means of these straps 18, thus facilitating the handling and carrying thereof, while enabling a person to carry more than one package with only one hand in the case of FIG. 12A designed for carrying from one to four packages and in FIG. 12B up to nine packages. In FIG. 12C one shows side straps 18' located at the side ends of the support base 17, also to enable one to carry the multi-pak assembly with nine packages, with the difference that it was designed for being carried with both hands. Each of these models of additional pieces may be more suitable for a given number of packages that constitute the multi-pak assembly. Several additional pieces may be used simultaneously on the same assembly, depending on the weight and on the number of packages.

FIGS. 9A to 9D show other merely illustrative examples of use of the package system according to the invention such as assembly blocks, for building toys. In FIG. 9A, one uses only one assembly block, to which additional engagement pieces in the form of arms, legs and head are coupled, forming a puppet. As can be seen in FIG. 9B, a toy fish has been built by coupling three assembly blocks and more additional engagement pieces forming the head and the tail of the animal. FIG. 9C shows a construction similar to a toy spider, with an assembly block forming its body, and the additional engagement pieces forming its paws. And FIG. 9D shows a toy train that is formed by a number of assembly blocks coupled in line, representing wagons, and additional engagement pieces containing small wheels for the train. The additional pieces may alternatively be glued to the assembly blocks.

Thus, the assembly blocks may contribute to increase the sale of the products contained in the package, since the more the packages are consumed, the more block for assembling various toys the consumer of the product will have for playing and assembling, forming a fitting game of the Lego type. Together with the package systems, different additional engagement pieces may be provides, which enable one to build varied toys, such as locomotives, toy cars, spacecrafts, animals and different characters. The toy thus produced will have a quite low cost, being especially attractive to lower-income classes, since one has not to spend additional money to buy only one toy, because it is intrinsically associated to the sale of a consumable product, for example, drink, food or even a hygiene product. At the same time, the package system according to the present invention further has educational nature, fostering the creativity in each person who has these blocks on their hands. It is important to remind that the package used for forming the assembly block should be duly washed. In order to wash the package, one may fill it with water and a small amount of detergent, shake it and them empty it, or use any other cleaning method suitable for the type of package and the product that it carried. The cleaning is especially important in cases of perishable products, in order to prevent the proliferation of bacteria and, as a result, bad smell, as well as ants and cockroaches.

Besides, this package system enables the recycling cost to be ready included in the prices of the product. This means that the recycling cost, in this case, falls on the consumer, exonerating the public services and the investments made by companies subsequently. It also exonerates the manufacturer, which does not need to invest in recycling these packages or in collecting them. None of the prior-art documents provides this economical advantage.

In this regard, according to an embodiment of the invention, each structural piece 12, 13 of the package system may be constituted approximately by the same amount of PET of a PET package after it is recycled, that is, the material used for building each structural piece would come from the recycling of a PET bottle. This reuse of the recycled material from the PET bottles is particularly advantageous, considering the fact that the volume of PET recycled exceeds the capacity of using it. Thus, upon acquiring a package system of the present invention, the consumer would have helped to remove from the environment two further PET packages, since the package system is "self-intended" in the sense that it offers various solutions for its purpose, and enables one to recycle other packages, which makes it doubly ecological and responsible, besides being creative, thus closing a sustainable cycle around itself. In this case, it is also up to the consumer to do his part, reusing the material in some of the various forms offered by the package system. And upon reusing this recycled material from PET bottles by means of the package system of the present invention, the consumer further aggregates value to this material, which would be disposed.

Figure 10:
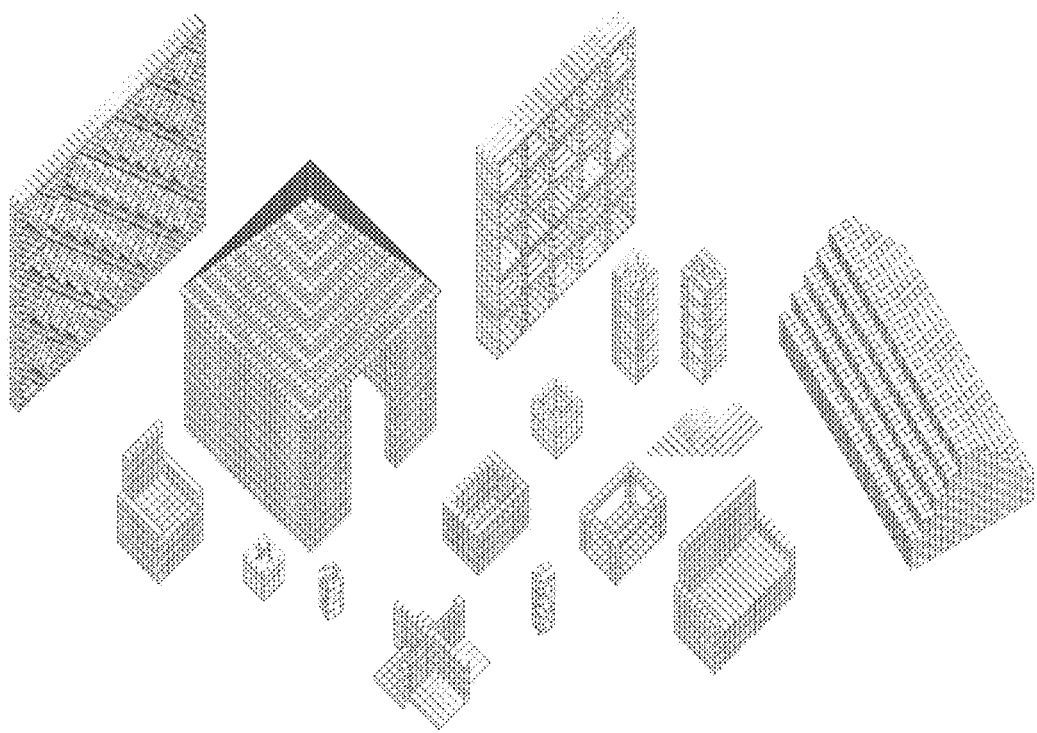
FIG. 10 is a perspective view of various examples of structures constituted by coupling a plurality of systems of compactable packages that are reused according to the present invention.

Another way of using these assembly blocks is to employ them in building construction structures, as shown in FIG. 10. Depending on the resistance of the materials that constitute the structural pieces and the package, these assembly blocks may have good resistance and be used in building pieces of furniture, partition walls or even walls for low-cost houses, for instance, by functioning as ecological bricks or molds for molding low-cost concrete. As examples of structures formed by the assembly blocks, one can build from doll houses (shown in FIG. 10) to bookshelves, sales stands, arm-chairs, sofas, center tables, old trucks, among others.

The assembly blocks manufactured for this structural purpose may give rise to bricks that would be used in the civil construction, chiefly for building low-cost houses, thus fulfilling a social function. As already mentioned before, in this case it is advantageous that the material that constitutes the structural pieces 12 and 13 of the assembly block should be anti-flame, thus meeting the legal provisions foreseen in technical rules.

The assembly blocks according to this embodiment of the invention can be used in various ways in the civil construction, for instance, forming hollow walls with inner spans, which may or may not be filled with other materials that fulfill a technical or structural function (concrete, earth, gravel, etc). They may also be used for building walls with grooves and space for tubing, pillars and electric wiring, which facilitates not only the construction but also the future maintenance of these structures, inasmuch as there would not be the need to break the wall thus built, in the event of leakage, for instance.

These assembly blocks also enable parts of a house to be pre-manufactured, being assembled at other places and coming ready-made at their destination, thus facilitating and expediting the building thereof.

The assembly blocks may also be used as a mold for reinforced concrete. In this case, as shown in FIG. 14, finish ruler 25 (such as a PVC sheet or wood sheet, or even some type of mortar, etc.) may serve to level and face engagement grooves. These assembling rulers 25 have a shape compatible with the external engagement means of the hollow structural pieces and are housed between them, so as to form assembly blocks having smooth and leveled surfaces. The walls made with these assembly blocks can be used as structure mold.

The finish rulers may also be used as finish for pieces of furniture and other objects resulting from the assembling of the modules.

The package system according to the invention may also comprise auxiliary support pieces engaged on the outside of a combination of various assembly blocks fitted together, in order to aid in keeping and supporting the assembly blocks fitted to each other. For instance, if ten assembly blocks are engages vertically by their external engagement means on their upper and lower engagement surfaces, forming a determined object, this object could be dismounted if someone exerted pressure so as to displace horizontally one of the assembly blocks. The auxiliary support piece could be, in this case, a rod or corner-piece with length equivalent to that of the ten engaged blocks, which would prevent the displacement of one of the blocks by mere pressure in the horizontal direction. With every combination of assembly blocks, one may apply more than one auxiliary support piece, for the same purpose of preventing them from sliding with respect to each other.

The present invention aggregates a huge value to the package, inasmuch as the latter may be transformed in an unlimited manner, thus enabling the most varied used.

Moreover, since there is no recycling proper of the package in the sense of processing its material to generate a new product, but only its integral reuse adapted for a new purpose, there is no waste of raw material or expenditure with resources and materials required in the recycling process, such as water, electric energy and additives. This immediate reuse of the package also brings the benefit of reducing the amount of garbage disposed, even if the latter were intended for subsequent recycling. Besides making the consumers aware and inserting them in the recycling process, enabling them to witness and experience the process, thus bringing together the parties involved—consumer and manufacturer. In this way, one prevents costs and labor involved in separating, compacting and transportation of this garbage, which are also considerable. Besides, one prevents the disposal and accumulation of garbage at damping grounds, where some objects like plastic packages may remain for long periods, due to the long time required for decomposition of these materials. Thus, the package system in question has a great environmental approach, since it reduces directly and indirectly the amount of garbage stored and produced in the cities, in addition to the already-mentioned social appeal resulting from the use of the packages in building houses and pieces of furniture that could meet the needs of people having low income, such as re-qualification of garbage collectors, who may become an assemblyman.

On the basis of the description of the package system and its functioning presented above, a few benefits provided by this system can be cited:
- decrease in the accumulation of urbane garbage and of the amount of garbage sent to damping grounds, contributing to cleaning the city, and reducing pollution;
- decrease in the consumption of energy and in the extraction of natural resources, minimizing the exhaustion of non-renewable resources;
- awareness of the citizens with regard to the disposal of garbage, modifying their personal attitudes and practices, and giving a direct contribution to the preservation of the environment by reusing the packages; and
- instead of the package being recycled and transformed, they are considered products suitable for immediate reuse in various manners, which enlarges the application horizon.

Another great advantage of the invention to be especially pointed out is that the configuration of this compactable package system enables the packages to be reused, by the external pieces that compose the assembly block will never come into contact with the contents of the package. In this way, there is no restriction of material to be sued in the structure of the block, since the latter does not make any interference with the contents of the package. Thus, this contents preserves its flavor, odor, color and other properties in the same way as it would do in an ordinary package.

A preferred example of embodiment having been described, one should understand that the scope of the present invention embraces other possible variations, being limited only by the contents of the accompanying claims, which include the possible equivalents.

The invention claimed is:

1. A system comprising:
   a compressible package (10) having a top end and a bottom end; and
   at least one structural piece (13) for compacting and housing the package, each at least one structural piece (13) having an outer surface and an inner surface and being provided with an inner cavity (2), inside which one of the package top and bottom ends is coupled, wherein the at least one structural piece (13) comprises:
external engagement means arranged on the outer surface of the at least one structural piece (13) for engagement with at least one external piece provided with compatible engagement means,
retention means arranged in the inner cavity for retention of the package inside said at least one structural piece; and
mutual engagement pieces that are coupled and locked to corresponding mutual engagement pieces arranged on a second structural piece (12) of the package system coupled to the opposite top or bottom end of the package, or in a region of the outer surface of the opposite end of the package, when the package is in compressed state, forming an assembly block housing the compressed package inside the inner cavity (2) of the at least one structural piece (13).

2. A system according to claim 1, wherein the at least one structural piece (13) consists of a single structural piece (13) on the top end of the package, the single structural piece being provided with on its inner surface, which are coupled and locked to corresponding mutual engagement pieces (22) arranged in a lower region (23) of the outer surface of the package (10), when the package is in compressed state, and the package remains within the cavity (2) of said upper structural piece (13).

3. A system according to claim 1, wherein the at least one structural piece (13) consists of a first structural piece and a second structural piece, the first structural piece (13) being coupled to the upper end of the package and the second structural piece (12) being coupled to the lower end of the package.

4. A system according to claim 3, wherein:
the first structural piece (13) is an external structural piece with the mutual engagement pieces (2) arranged on its inner surface;
the second structural piece (12) is an internal structural piece with the mutual engagement pieces (19) arranged on its outer surface; and
when the first and second structural pieces (12, 13) are mutually engaged, the first structural piece (13) overlaps at least partly the second structural piece (12) and the package remains housed in the cavity of the first structural piece (13) and the cavity of the second structural piece (12).

5. A system according to claim 1, wherein the mutual engagement pieces of at least one structural piece (13) comprises at least one recess (20) in its inner surface, and the corresponding mutual engagement pieces comprises a shoulder (19) on the outer surface of the lower structural piece (12) or of the opposite end of the package, and wherein the recess (20) engages by pressure with the protrusion (19).

6. A system according to claim 1, wherein the package retention means comprises a plurality of flexible locking flaps (11) secured to the inner surface of the at least one structural piece (12, 13), which exert interference pressure on the outer surface of the package.

7. A system according to claim 1, wherein the at least one structural piece (12, 13) provided with retention means for the package has deformable walls (15) that bulge into the cavity, forming bulging that exert interference pressure on the package.

8. A system according to claim 1, wherein the external engagement means (4, 5, 7, 8) of an assembly block formed by the package system are couplable to the external engagement means of another assembly block formed by a similar package system.

9. A system according to claim 1, wherein the at least one structural piece (12, 3) has a shape with polygonal cross section and is provided with external engagement means on one of its outer faces.

10. A system according to claim 1, wherein the at least one structural piece (12, 3) comprises a material selected from the group consisting of: a rigid polymer, aluminum, wood, brass, resin and anti-flame materials.

11. A system according to claim 1, wherein the at least one structural piece (12, 13) comprises PET in an amount equivalent to the material coming from the recycling of a PET bottle.

12. A system according to claim 1, further comprising at least one auxiliary support piece that is engageable on the outer surface of a structural piece of a combination of a plurality of assembly blocks engaged to each other, keeping and supporting the assembly blocks engaged to each other.

13. A system according to claim 1, further comprising at least one additional fitting piece (17) coupled to the external engagement means of said at least one structural piece.

14. A system according to claim 13, wherein the additional fitting piece is coupled to at least one end of a carrier strap (18).

15. A system according to claim 1, further comprising two different types of said external engagement means, which have shapes that are complementary and couplable with each other, wherein each face that constitutes a polygonal cross section of said same structural piece is provided with a type of said external engagement means other than the type of said external engagement means arranged on faces that are laterally adjacent to it.

16. A mounted assembly comprising a plurality of systems as defined in claim 1, each of the assembly blocks being coupled to at least one further assembly block by their respective external engagement means.

17. A mounted assembly according to claim 16, further comprising two different types of external engagement means.

18. A mounted assembly according to claim 16, further comprising blocks with two different types of external engagement means, which have shapes that are complementary and couplable to each other, wherein all the engagement means of the same assembly block are identical to each other.

19. A mounted assembly according to claim 16, wherein all the blocks have the same type of external engagement means on each face, wherein the external engagement means comprise a negative fitting on one side and a positive fitting on the other side, wherein the negative fitting has a shape that is couplable to the positive fitting.

* * * * *

UNITED STATES PATENT AND TRADEMARK OFFICE
CERTIFICATE OF CORRECTION

Page 1 of 1

PATENT NO. : 9,108,764 B2
APPLICATION NO. : 13/641807
DATED : August 18, 2015
INVENTOR(S) : Gegembauer It is certified that error appears in the above-identified patent and that said Letters Patent is hereby corrected as shown below:

Title Page

"(74) *Attorney, Agent, or Firm* – Alston & Bird LLC" should read

--(74) *Attorney, Agent, or Firm* – Alston & Bird LLP--

Signed and Sealed this
Twenty-fourth Day of May, 2016

Michelle K. Lee
*Director of the United States Patent and Trademark Office*